United States Patent

Gualano

[15] 3,643,902
[45] Feb. 22, 1972

[54] AUTOMOBILE STAFF HOLDER

[72] Inventor: Emil V. Gualano, 10711 Beverly Blvd., Whittier, Calif. 90601

[22] Filed: July 9, 1970

[21] Appl. No.: 53,390

Related U.S. Application Data

[62] Division of Ser. No. 867,304, Oct. 17, 1969, Pat. No. 3,540,685.

[52] U.S. Cl. .................. 248/40, 116/173, 224/42.45 R, 248/226 A
[51] Int. Cl. .................................................. G09f 17/00
[58] Field of Search ............... 248/38, 226 A, 40, 42, 43, 248/314; 116/28, 173; 224/42.45 R

[56] References Cited

UNITED STATES PATENTS

| | | | |
|---|---|---|---|
| 1,834,682 | 12/1931 | Calstad | 248/226 A X |
| 2,908,099 | 10/1959 | Burke | 248/38 UX |
| 3,136,289 | 6/1964 | Johnson | 116/28 |

*Primary Examiner*—J. Franklin Foss
*Attorney*—Larson, Taylor & Hinds

[57] ABSTRACT

A staff holder having a C-shaped member for attachment onto an elongated flange portion of an automobile. A socket device is mounted on and movable relative to the C-shaped member to present a vertical socket for vertically receiving a staff, regardless of the orientation of the C-shaped member. One embodiment includes a socket pivotally attached to the screw of the C member and another embodiment includes a rotating element attached to the C-shaped member and having a plurality of sockets therein, each at a different angle of inclination.

4 Claims, 8 Drawing Figures

PATENTED FEB 22 1972

3,643,902

INVENTOR
EMIL V. GUALANO

Larson, Taylor and Hinds
ATTORNEYS

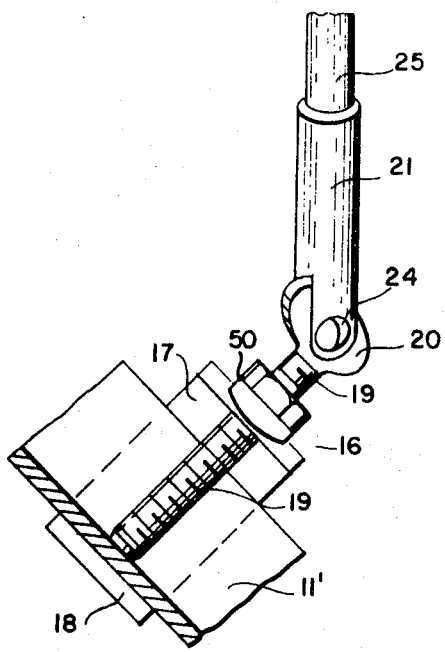
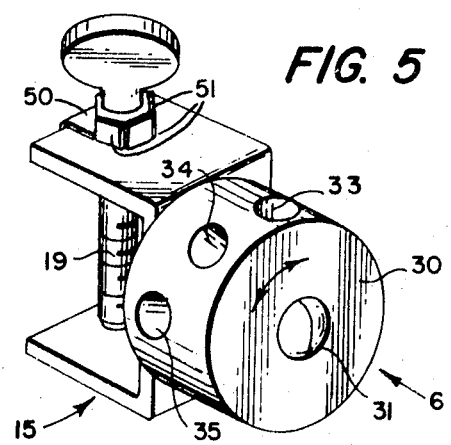
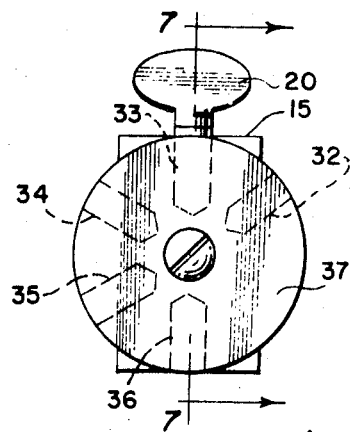
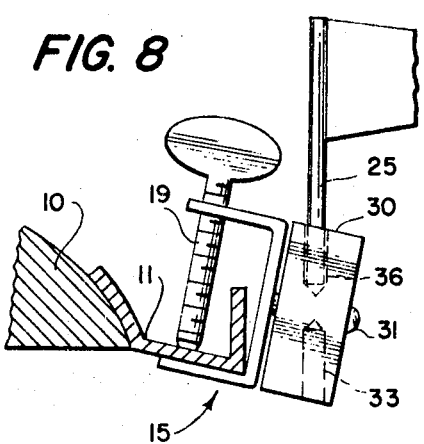
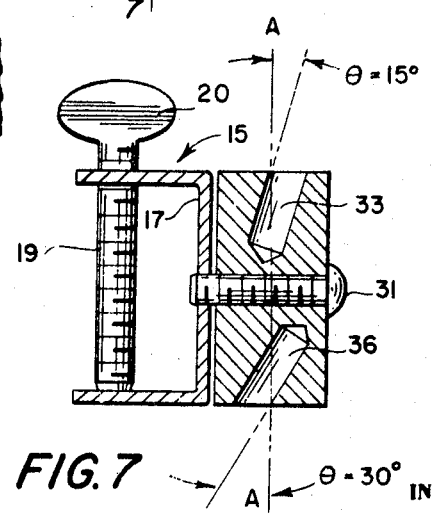
INVENTOR
EMIL V. GUALANO
Larson, Taylor and Hinds
ATTORNEYS

AUTOMOBILE STAFF HOLDER

This is a division of application Ser. No. 867,304, filed Oct. 17, 1969, now U.S. Pat. No. 3,540,685.

BACKGROUND OF THE INVENTION

This invention relates to staff holders, and in particular it relates to a device for attaching a staff onto an elongated flange portion of an automobile, such as a rain gutter and the like.

Numerous devices have been known heretofore for attaching staffs such as pennant or flag staffs and the like to the rain gutter of an automobile. However, all known devices have suffered from the disadvantage that they are uneconomically limited to one, or at best only a very few makes and models of automobiles. In most of these devices a simple socket is rigidly connected to a clamping element which serves to rigidly secure the assembly to the rain gutter. This arrangement would be fine if, as assumed in the prior art, all automotive rain gutters included a flat, horizontal bottom portion to which the clamping elements of the assembly could be attached. However, in practice, the exact opposite is true. In almost all makes and models of cars, the bottom of the elongated rain gutters are either round or are inclined upwardly or downwardly. Thus, when a device of the prior art is actually attached to a rain gutter on almost any make or model of automobile on the road today, the clamping portion of the device will be tilted inwardly or outwardly and hence the socket portion rigidly attached thereto will not be vertical. Of course, the socket portion could be rigidly attached to the clamping element in the first place at a specified angle so that it remained vertical for a given tilt of the clamping element. However, the device will then be applicable only to the very few makes and models of automobiles having rain gutters the bottoms of which have that particular angle of tilt.

Other prior art devices are known wherein the socket member is not attached rigidly to the clamping portion of the device but is somewhat flexible relative thereto so that the pennant staff can be turned about an axis parallel to the rain gutter. However, these devices are limited in their applicability since, in order for the pennant staff to remain vertical, they must be applied to a horizontal portion of the rain gutter. However, in practice, on most automobiles a major portion of a rain gutter extends in a generally vertical direction. This would apply, for example, to the portion of an automotive rain gutter extending downwardly along the side of the front windshield. It would not be possible to apply a rain gutter clamping device of the latter type to a vertically extending portion of a rain gutter and still maintain the socket in a vertical position for vertically receiving a pennant staff.

Thus, notwithstanding the fact that numerous automobile flag staff clamping devices have been known heretofore, there exists a need for a universal staff holder which can be applied anywhere along the length of the rain gutter and can be applied to any automobile regardless of the angle of inclination of the bottom of the rain gutter from a horizontal plane.

SUMMARY OF THE INVENTION

Thus, it is a purpose of this invention to provide a new and improved staff holder for use on an automobile. More specifically, it is a purpose of this invention to provide a new and improved staff holder which may be attached at any point along a length of a rain gutter and which is universally applicable to all automobiles regardless of the shape of the rain gutter cross section.

Basically, the purpose of the present invention is achieved by constructing the staff holder with two main portions, a rain gutter clamping portion and a pennant staff holding portion, and by attaching these two portions together so that a plurality of different socket positions are provided, relative to the clamping portion, wherein it is nearly always possible to provide a vertically oriented socket regardless of the orientation of the clamping portion; that is, regardless of any tilting of this clamping portion about an axis parallel to the rain gutter or about a horizontal axis perpendicular to the rain gutter.

In accordance with the present invention, the clamping portion preferably comprises a C-shaped member adapted to fit about the rain gutter and including a screw passing through the top of the C-shaped member for clamping the rain gutter between the bottom of the screw and the bottom of the C-shaped member.

In a first embodiment of the invention, the socket portion comprises a hollow socket pivotally connected to the top of the said screw. Consequently, the socket holder can pivot through approximately 180° about the head of the screw. In practice, owing to the partially resilient nature of the metal, and in view of the low pitch of the thread of the screw, it is always possible to turn the screw through approximately 180° while still holding the rain gutter tightly and securely. The combination of these two movements is a universal connection between the C-shaped member and the socket member. Consequently, regardless of the angular position of the C-shaped member, it is always possible to arrange the socket member vertically for vertically receiving a pennant staff.

In another embodiment of the invention, a rotating element is attached to the back of the C-shaped member and this rotatable element has formed in its outer peripheral surface a plurality of sockets, each inclined at a different angle from a plane perpendicular to the angle of rotation of the elements. Thus, after the C-shaped member has been clamped onto the rain gutter, the rotatable element is rotated until one of the sockets is vertical. A screw means then rigidly secures the rotating element in this position and the staff is placed into the vertical socket. Thus, with this arrangement, as with the first arrangement, a staff may be mounted vertically regardless of the angular orientation of the C-shaped member, and hence, regardless of the portion of the rain gutter to which the device is applied and regardless of the cross-sectional shape of the rain gutter at that point.

Thus, it is an object of this invention to provide a new and improved staff holder for an automobile.

It is another object of this invention to provide a new and improved staff holder which is universally adjustable relative to the portion of the automobile to which it is attached.

It is another object of this invention to provide a C-shaped member for attaching a staff holding device to an automobile coupled with a socket means which provides a vertical socket for a staff regardless of the angular orientation of the C-shaped member.

It is another object of this invention to provide a staff holding device including a C-shaped member for rigidly clamping the device to a rain gutter or other elongated flange portion of an automobile, including a socket for receiving the staff pivotally connected to a screw which cooperates with the C-shaped member to attach the device to the flange portion of the automobile.

It is another object of this invention to provide a staff holding device wherein a rotating element having a plurality of differently inclined sockets formed therein is connected to a C-shaped member which in turn is attachable to a rain gutter or other flange portion of an automobile.

Other objects and the attendant advantages of the present invention will become apparent from the detailed description to follow together with the accompanying drawings.

BRIEF DESCRIPTION OF THE DRAWINGS

There follows a detailed description of preferred embodiments of the invention to be read together with the accompanying drawings. However, the description and the drawings are provided only for purposes of illustration.

FIG. 4 illustrates the first embodiment of the invention as applied to a vertically inclined portion of a rain gutter, and is taken along line 4—4 of FIG. 1.

FIG. 5 is a perspective view of a staff holding device constructed in accordance with a second embodiment of the invention.

FIG. 6 is an end elevational view taken in the direction of the arrow 6 of FIG. 5.

FIG. 7 is a cross-sectional view taken through a plane corresponding with the line 7—7 of FIG. 6.

FIG. 8 is a side elevational view taken from a plane parallel to the plane of the cross section of FIG. 7 and showing this second embodiment of the invention in use, mounted on the rain gutter of an automobile.

DETAILED DESCRIPTION OF THE PREFERRED EMBODIMENTS

Figure 1:
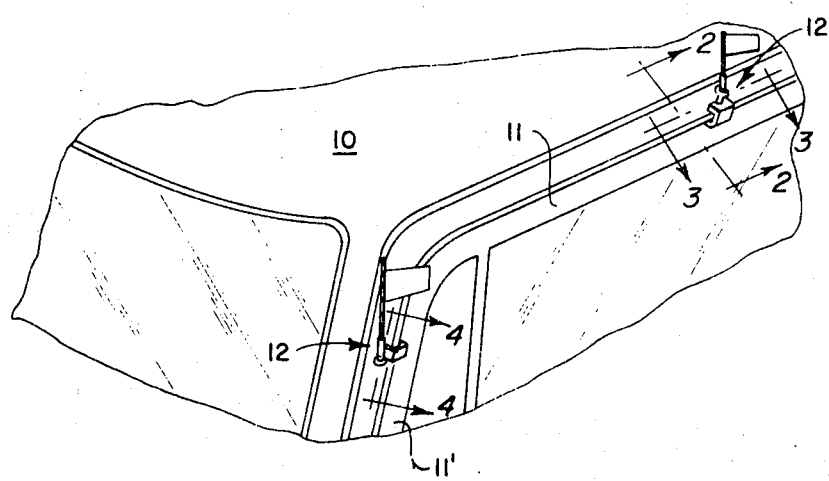
FIG. 1 illustrates a portion of an automobile having two staff holders mounted thereon, each constructed in accordance with a first embodiment of the present invention.

Referring now to the drawings, like numerals represent like elements throughout the several views.

FIG. 1 illustrates a portion of an automobile 10 having a rain gutter 11 on which are mounted two staff holders 12 constructed in accordance with a first embodiment of the present invention. This embodiment is shown in more detail in FIGS. 2-4.

Figure 2:
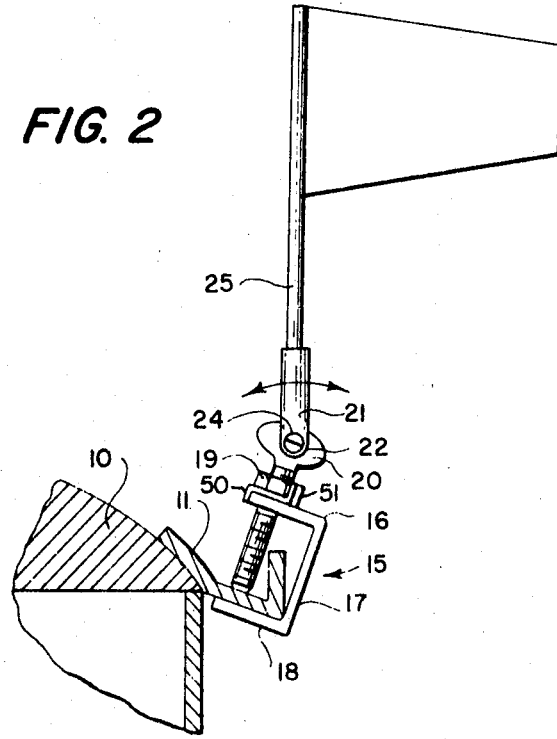
FIG. 2 is a side elevational view of a first embodiment of the invention and is taken along line 2—2 of FIG. 1.
Figure 3:
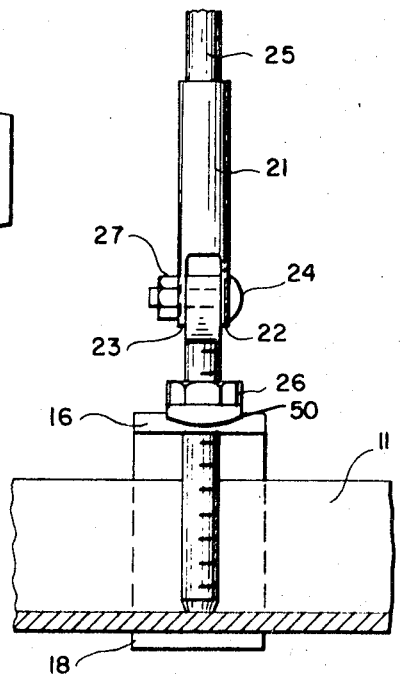
FIG. 3 is an end elevational view of a first embodiment of the invention and is taken along line 3—3 of FIG. 1.

Referring first to FIGS. 2 and 3, the staff holder 12 includes a C-shaped member having a top leg 16, a back portion 17 and a bottom leg 18. The staff holder 12 also includes a wing nut 19 having an enlarged head 20. For securing the member 15 to the rain gutter 11, the base of the rain gutter is secured between the lower leg 18 and the bottom of screw 19. After the screw 19 has been tightened, it is held in place by means of locking nut 26. A socket member 21 has lower flange portions 22 and 23 which extend downwardly on both sides of enlarged portion 20. A screw 24 passes aligned apertures in elements 20, 22 and 23, this screw being held by nut 27. With this arrangement, the member 21 is pivotable about the axis of screw 24. When this member has been pivoted to a selected position, nut 27 is tightened to hold the member 21 in its selected position relative to enlarged head 20. A conventional staff such as a pennant or flag staff 25 is then inserted into the hollow socket member 21.

As is evident from FIG. 2, the bottom of rain gutter 11 is not horizontal but rather it is sloped downwardly and outwardly. Thus, if the socket member 21 were rigid with either the screw 19 or the member 15, it would no doubt also extend outwardly in a direction parallel to the screw. However, in accordance with a feature of the present invention, the socket member 21 is mounted for pivotal movement and hence it is turned about its pivot screw 24 until it is vertical, at which time the nut 27 is tightened.

FIG. 4 illustrates the same embodiment of the staff holder, but attached to a vertically extending portion of the rain gutter 11' as shown in FIG. 1. In this case, after the nut 19 is tightened, it is turned an additional amount until the screw 24 lies in a horizontal plane. This is possible because of the low pitch of the threads on screw 19 and the slight degree of resilience of the metal rain gutter 11'. The socket member 21 is then turned about the screw 24 until it is vertical at which time the nut 27 is tightened. A pennant staff 25 may then be vertically received in the socket member 21.

FIGS. 5-8 illustrate another embodiment of the invention. This embodiment employs the same C-shaped member 15 in the same nut 19 although in this case it is not essential that the nut 19 include the enlarged head 20. In this embodiment the socket means for holding the staff includes a multiple socket wheel element 30 attached by means of a screw 31 to the back 17 of the C-shaped member 15. The element 30 is rotatable about the nut 31. However, after the element 30 has reached a desired angular position, it is locked and placed by tightening the screw 31.

Thus, element 30 includes a plurality of sockets 32 through 36 opened toward the outer periphery thereof. The line A—A in FIG. 7 represents a plane perpendicular to the nut 31. Each of the five sockets 32—36 are inclined at a different angle (see FIG. 7) relative to the plane represented by A—A. In a preferred embodiment of the invention, socket 32 will be inclined in an angle of 30° from the plane A—A to the right as shown in FIG. 7. Socket 33, which is visible in FIG. 7, will preferably be inclined 15° from the plane A—A to the right as shown in FIG. 7. Socket 34 is parallel to plane A—A, socket 35 is inclined to the left by 15° from plane A—A and sockets 36 (which is also visible in FIG. 7) is inclined to the left from plane A—A by 30°.

The values of the angle $\theta$ for sockets 32–36 have been found to be desirable as they permit the staff holder of this embodiment to be incorporated on almost all vehicles. However, it is of course within the scope of the invention to use any number of sockets and to incline these sockets at any different angles. Also, the sockets may be spaced apart about the axis of bolt 31 by any desired amount. However, in the present invention the sockets are spaced apart by 60° leaving a blank area 37 to be drilled at any desired angle to fulfill a specific need.

FIG. 8 illustrates the staff holder of FIGS. 5-7 as applied to the horizontal portion 11 of the rain gutter of FIG. 1. As in FIG. 2, the inclined angle of the bottom of rain gutter 11 causes a C-shaped member 15 and the screw 19 to be inclined. In this case, assuming the downward inclination of the bottom of rain gutter 11 is 30°, the element 30 is rotated until socket 36 is uppermost at which time the socket will be vertically oriented. The staff 25 is then inserted into this socket in a vertical position. It is, of course, apparent that the staff holder of FIGS. 5-8 is equally applicable on the vertically extending portion of the rain gutter 11'. In this case the selected socket, when vertical, will of course then lie askew to the nut 19. Although the specific dimensions are not critical, in a preferred embodiment of the invention, the diameter of element 30 will be 1⅛ inches and the individual sockets in the embodiment of FIG. 1 as well as in the embodiment of FIG. 2 will be 11/64 of an inch to snugly hold a wooden flag staff of 3/16 of an inch diameter.

Although the invention was contemplated primarily for its use on the rain gutter of an automobile, its unlimited versatility lends itself to other equivalent uses. For example, the elongated flag portion may be the bottom or top of a front bumper of an automobile. With the member 15 thus clamped to the front bumper and presenting a vertical socket, an indicator staff may be placed therein thereby visually indicating to the driver the location of the front corner of the bumper. A light could be put on this indicator staff, which light could be hooked up with the lights of the car.

Although the invention has been described in considerable detail with respect to preferred embodiments thereof, it will be apparent that the invention is capable of numerous modifications and variations apparent to those skilled in the art without departing from the spirit and scope of the invention.

Between the top horizontal portion of the clamp and the hex lock nut there is an antitheft flanged slotted washer 50. When the staff socket has been adjusted vertically and the lock nut secured firmly then the final operation is with small chisel or sturdy screw driver and hammer bend the three outer tabs 5' up over the lock nut, so that no one can apply a wrench to the lock nut to loosen and steal the clamping device. The clamp remains on the rain gutter all the time, but the flag is removed at night and replaced in the socket in the morning, or removed and replaced when the vehicle goes through a wash rack.

I claim:

1. A staff holder for attachment onto an elongated, generally flat flange portion of an automobile, comprising a C-shaped member, holding means for rigidly securing the member onto the said flange portion with the latter located between the two generally parallel free legs of the C-shaped member, a socket means mounted on the attachment and movable relative to the C-shaped member such that when the C-shaped member is rigidly secured to the flange portion, the socket means is movable to vary the position of the socket means both in a plane parallel to the direction of elongation of the flange portion and in a plane perpendicular to the said direction of elongation, wherein, for a plurality of different angular orientations of the C-shaped member about horizontal axes parallel or perpendicular to the said direction of elongation, a socket may be placed in a generally vertical plane to receive a staff vertically therein, said socket means comprising a multiple socket element mounted on the C-shaped member for rotational movement about an axis, said element including a plurality of hollow staff sockets therein, each of said sockets forming a different angle with a plane perpendicular to the axis of rotation.

2. The staff holder of claim 1, wherein said element is connected by a screw to the back of the C-shaped member, said screw acting as a turning pin for said element and being movable to secure the element in a selected angular position.

3. The staff holder of claim 2, said element being in the form of a wheel having five sockets formed therein and opening onto the periphery of the wheel, said sockets forming angles of $-30°$, $-15°$, $0°$, $+15°$ and $+30°$ relative to a plane perpendicular to the axis of rotation of the wheel element.

4. The staff holder of claim 3, wherein said five sockets are spaced apart by $60°$ about the axis of the wheel element, leaving a blank peripheral portion which extends approximately $120°$ about said axis of the wheel element.

* * * * *